Figure 1:
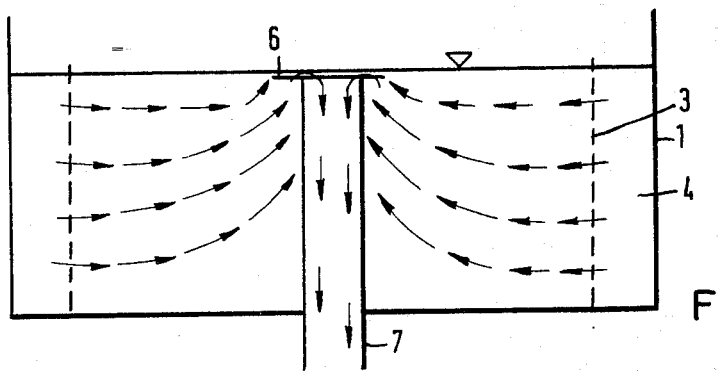

United States Patent [19]

Moll et al.

[11] 4,349,441
[45] Sep. 14, 1982

[54] FLUID TREATMENT METHOD AND APPARATUS

[76] Inventors: Hans-Georg Moll, Görzallee 49a; Andreas Grohmann, Drakestrasse 52a, both of D-1000 Berlin 45; Ulrich Hässelbarth, Adolfstrasse 3, D-1000 Berlin 37; Helmuth Marks, Maulbeerallee 54, D-1000 Berlin 20, all of Fed. Rep. of Germany

[21] Appl. No.: 165,521

[22] Filed: Jul. 3, 1980

[30] Foreign Application Priority Data

Jul. 6, 1979 [DE] Fed. Rep. of Germany ....... 2927802

[51] Int. Cl.$^3$ ............................................. B01D 21/26
[52] U.S. Cl. ................................. 210/512.1; 210/513
[58] Field of Search .................... 210/512.1, 787, 788, 210/801, 800, 304, 521, 513

[56] References Cited

U.S. PATENT DOCUMENTS

| | | | |
|---|---|---|---|
| 3,406,825 | 10/1968 | Schouw | 210/788 |
| 3,444,077 | 5/1969 | Finch | 210/512.1 X |
| 4,297,221 | 10/1981 | Moll et al. | 210/512.1 X |
| 4,299,703 | 11/1981 | Bezard et al. | 210/512.1 |

Primary Examiner—Thomas G. Wyse
Attorney, Agent, or Firm—O'Rourke & Harris

[57] ABSTRACT

Method and apparatus for treating raw water by introducing the raw water and a flocculating agent into a cylindrical container, preferably in a tangential manner of flow between the cylindrical container wall and a baffle spaced radially inward from the container wall, flowing the fluid radially inward towards the center of the container to a central conduit extending axially upward in the container and opening at the internal bore of the conduit through the bottom of the container, the central conduit being surrounded by a coaxial pipe having a plurality of circumferentially defined, spaced openings therein to induce a radial, i.e., from the wall of the container to the central conduit, flow of water with minimal axial flow components in order to facilitate settling of the flocculated particles from the treated water. Preferably the coaxial pipe is divided into a plurality of sections, each section including a solid portion and an opening with the solid portion and opening being of a constant overall dimension, but with the opening increasing relative to the solid portion with greater spacing from the bottom of the container in order to compensate from the suction effect of fluid flowing between the coaxial pipe and the conduit. Also, the cross sectional area defined by the annulus between the coaxial pipe and central conduit is preferably substantially the same as the area of the conduit bore.

6 Claims, 3 Drawing Figures

U.S. Patent    Sep. 14, 1982    4,349,441

FLUID TREATMENT METHOD AND APPARATUS

The invention concerns a device for treating raw water, such as surface water, waste water or the like, in a cylindrical container in the course of sedimentation by means of flocculation provided with water. The water flows through the container and, after remaining in the container for a sufficient length of time, is drawn out of the container at the surface at a rate of climb which is less than the rate of sink of the flocculent.

In accordance with a proposal made by the applicants, the water mixed with the flocculent material is fed into the container tangentially at its lower periphery; the peripheral rate of the water flowing into the container is reduced by regulation to such an extent that the formation of secondary flows upward is eliminated and the flocculent-free, clarified water is drawn out downward through the center of the container. (This proposal cannot account for the state of technology and ensures optimal flow conditions at a very minimal cost.)

If a liquid is fed into a cylindrical container tangentially, so-called secondary flows arise which lead to vertical flow upward at the center of the container; these secondary flows are called the "tea cup effect". When these secondary flows arise at the center of the container, their velocity is considerably greater than the sink velocity of the flocculent, and this makes sedimentation impossible, that is, the flocculent cannot sink to the bottom of the container. Under the proposal of the applicants, the peripheral velocity of the flow entering the container is reduced by regulation in a very simple manner to such an extent that the secondary flows travelling downward at the periphery of the container and upward at the center, which lead to the "tea cup effect", are eliminated. As a result, the flocculent which forms inside the container settles out at the bottom of the container and the clarified water can be drawn out through its center.

To accomplish this, the container includes at least one feed nozzle arranged tangentially to its cylindrical wall. A baffle with perforations at its periphery is situated inside the container, forming a circular section between it and the periphery of the outside wall and extending downward almost to the bottom of the container. In the center of the container is a conduit running axially which penetrates the base of the container. Clarified water spills into the conduit at its open end at the top and is drawn out downward through the center of the container.

The raw water, whose flow rate is regulated by the baffle, passes through it and is then fed radially in the direction of the center conduit. The subsequent flow of raw water then drives it toward the top of the container, so that the clarified water can be drawn off over the top edge of the conduit. This device, according to the proposal of the applicants, always functions satisfactorily at full capacity as long as the rate of the raw water flowing into the container does not exceed a maximum value; this rate is determined by the size of the container and the construction of the baffle. However, if this value is exceeded for any reason, the rate at which water flows upward in the vicinity of the conduit is necessarily also increased. The danger then arises that small flocculent particles can enter the conduit; as a result, in such cases acceptably clarified water will not be obtained.

The fundamental problem which this invention seeks to solve is to construct the device, according to the proposal of the applicants, in such a manner that flocculent-free water will still be obtained even if the maximum value of the feed-rate is exceeded.

According to the main section of this claim, this problem is solved by a device in which a pipe is attached to the coaxial conduit (7); the pipe extends upward from the base of the container, surrounds that part of the conduit located inside the container, forms a circular section, and overlaps the open end of the conduit; the pipe is equipped with vertical slots distributed along its length at a distance; the circular slots are bridged by shot, narrow struts, three or four of which, for example, are evenly spaced around the periphery of the slots.

The sub-claims present further advantageous features of the invention which has been placed under protection in the main section of the claim.

If the pipe, which is equipped with circular slots and which surrounds that part of the conduit located inside the container, is positioned as specified in this invention, then it is ensured that the water inside the container will flow in a vertical direction practically up to the pipe and will be fed through the circular slots distributed along the length of the pipe and to the circular section between the pipe and the conduit. As a result, the flow in the circular section will be directed upward to the top end of the conduit.

Thus it is ensured that even flocculent particles formed in the raw water can settle out on the way to the pipe, so that even if the permissible flow-rate is exceeded, the possibility that small flocculent particles will be carried along into the clarified water is eliminated.

Bernoulli's equation determines the upward flow in the circular section:

$$\frac{c^2}{2} + \frac{p}{\rho} = k$$

where:
c = the velocity (rate) of flow
p = the pressure of the flow
$\rho$ = the density of the flow medium
k = a constant It follows from this equation that as the velocity increases, the pressure decreases as set forth in the equation. For example, if there are four circular slots in the pipe which overlaps the conduit, then four partial flows of water inside the container are introduced into the circular section between the pipe and the conduit. In the interest of achieving a uniform discharge from the container, the partial flows must be identical to one another.

If there are four circular slots, then ¼ of the water must enter at the bottom circular slot, another ¼ must enter at the circular slot above it, a third ¼ at the circular slot above that, and a fourth ¼ at the top circular slot. As a result of the progressive rise of part of the water upward in the pipe, the rate of flow in the circular section also increases progressively. As the pressure progressively decreases as set forth in the equation cited earlier, suction effects arise in the circular slots located above the bottom circular slot, so that if a uniform width is maintained for all of the circular slots, it is no longer possible to ensure a uniform discharge of clarified water. For this reason, the width of the circular slots increases from the top of the pipe to the bottom in such a way that a uniform waterfeed is ensured at all of the circular slots. To obtain an acceptable flow in the circular section, the cross-sectional area of the circular section is approximately the same as the cross-sectional area of the conduit; finally, the sum of the height of the parts of the pipe formed by the circular slots and of each associated slot width is the same for all parts of the pipe.

Figure 2:
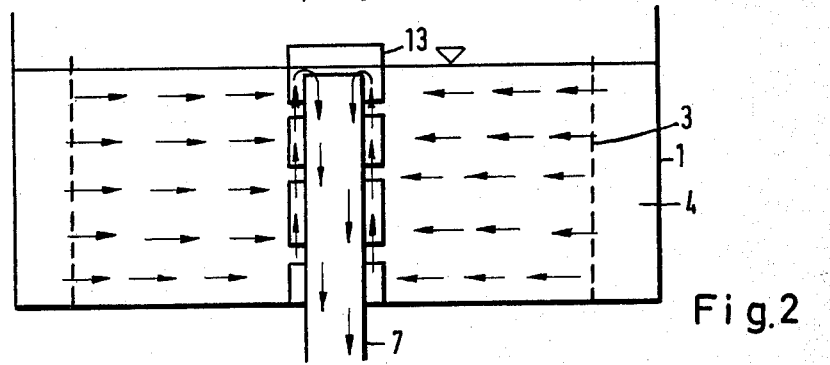
Figure 3:
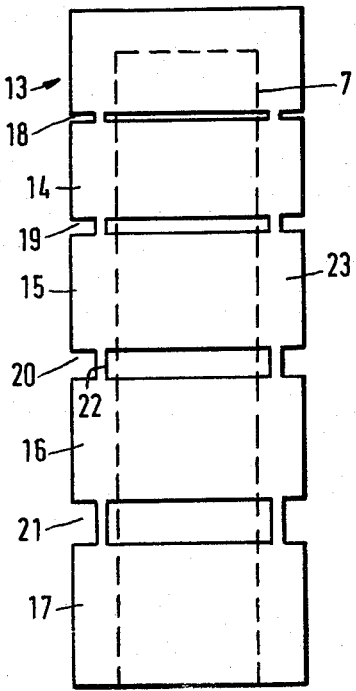

The enclosed sketch shows a working model of the invention and depicts:

FIG. 1 schematic diagram of the device according to the proposal of the applicants;

FIG. 2 schematic diagram of the device (according to the invention) with three circular slots; and FIG. 3 diagram of the pipe with four circular slots.

According to the proposal of the applicants, FIG. 1 shows the cylindrical container (1) with its baffle (3) and the circular section (4) between the baffle (3) and the periphery of the container (1); the axial conduit (7) is positioned at the center of the container; water flows into the conduit and out of the container as indicated by the arrows.

In FIG. 2 of the device (according to the invention), there is a pipe (13) which coaxially overlaps that part of the conduit (7) located in the container (13) and forms a circular section (23) in conjunction with the pipe. As FIG. 2 shows, water is carried out of the container in a vertical, radial flow practically up to the very wall of the pipe (13), where it enters through the individual circular slots, then flows upward in the circular section (23) and spills over the top, open edge of the conduit (7) in order to be discharged downward.

FIG. 3 shows the pipe (13) on an enlarged scale; it is equipped with four circular slots (18-21). The circular slots are bridged by narrow struts (22) which are evenly distributed along the periphery, so that when the circular slots (18-21) are punched out, the pipe (13) is divided into five sections (14-17 and 24). (TRANSLATOR'S NOTE: No number 24 is shown in FIG. 3.) The pipe (13) forms a circular section (23) in conjunction with the conduit (7). The water which flows out of the container and into the pipe (13) enters the circular section simultaneously through the four circular slots (18-21). The width of the circular slots (18-21), which decreases from the top to the bottom, ensures that an equal quantity of water enters through each circular slot (18-21); namely, one ¼ of the water through each slot. The cross-sectional area of circular section (23) is approximately equal to the cross-sectional area of the conduit (7). The pipe (13) rests with its lower section (17) on the base of the container (1) and the height of each individual circular element plus its associated circular slot is a constant value for each circular element. The height of pipe section (17) plus the width of circular slot (21) is equal to the height of the pipe section (16) plus the width of circular slot (20). The same holds true for the pipe sections located above these.

We claim:

1. Apparatus for treating water comprising:
   a cylindrical container having a central axis and adapted to contain a fluid;
   baffle means spaced radially inward from the cylindrical container wall and defining an annular volume between the baffle means and cylindrical container wall;
   means for introducing a fluid into the annular volume defined in the cylindrical container and tangential thereto;
   a conduit communicating through the bottom of the cylindrical container and extending axially upward from the bottom of the container; and
   a pipe coaxially positioned around and spaced from the conduit to define an annulus therebetween, the pipe having a plurality of axially spaced, circumferentially defined slots defined therein;
   whereby fluid introduced at the wall of the cylindrical container will flow with a substantial radial component inward through the pipe slots with minimal flow in the axial direction of the container to facilitate settling of sediment in fluid and permit flow of clear fluid through the slots and out through the conduit.

2. Apparatus as set forth in claim 1 in which the slots defined circumferentially around the coaxially pipe are progressively smaller in area as a function of distance from the bottom of the cylindrical container whereby flow through the slots may be maintained at a substantially constant rate for each slot by compensating for the suction of flow through the annulus between the coaxially pipe and the conduit.

3. Apparatus as set forth in claim 1 in which the area of the annulus defined between the coaxial pipe and the conduit is substantially equal to the area of the internal bore of the conduit.

4. Apparatus as set forth in claim 1 in which the coaxial pipe is divided into sections of equal length with each section including a circumferential slot, and in which the solid portion of each section becomes progressively larger and the slot progressively smaller as a function of the spacing of the slot from the bottom of the cylindrical container.

5. Apparatus for treating waste water comprising:
   a cylindrical container having a side wall and a bottom positioned around a central axis;
   baffle means positioned radially inward and spaced from the side wall of the cylindrical container to define an annulus between the baffle means and the cylindrical container;
   means for tangentially inducing a flow of water to be treated into the annulus defined by the baffle means and the cylindrical container walls;
   a central pipe having a bore defined therethrough positioned around the cylindrical container axis and communicating through the bottom of the cylindrical container; and
   a coaxial pipe defined around and radially spaced from the central conduit, the coaxial pipe having defined circumferentially therearound a plurality of axially spaced slots, the slots being progressively smaller in area as a function of spacing along the cylindrical container axis from the bottom of the cylindrical container.

6. Apparatus as set forth in claim 5 in which the coaxial pipe is divided into equal length sections each of which includes a circumferential slot, the solid portion of the sections being progressively greater in length as a function of the distance from the bottom of the cylindrical container.

* * * * *